March 6, 1951     E. FEINBERG     2,544,592
AIR CONDITIONING APPARATUS
Filed March 16, 1948     2 Sheets-Sheet 2
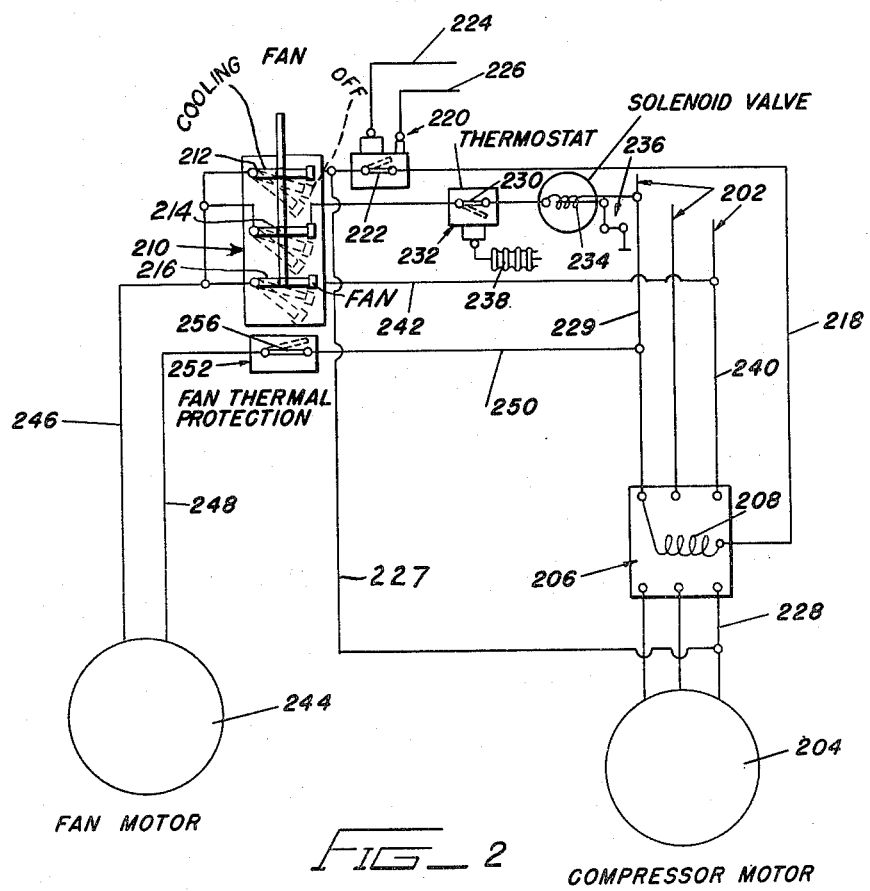
FIG_2
INVENTOR.
EMANUEL FEINBERG
BY
Haueke, Hardesty & Schmidt
ATTORNEYS.

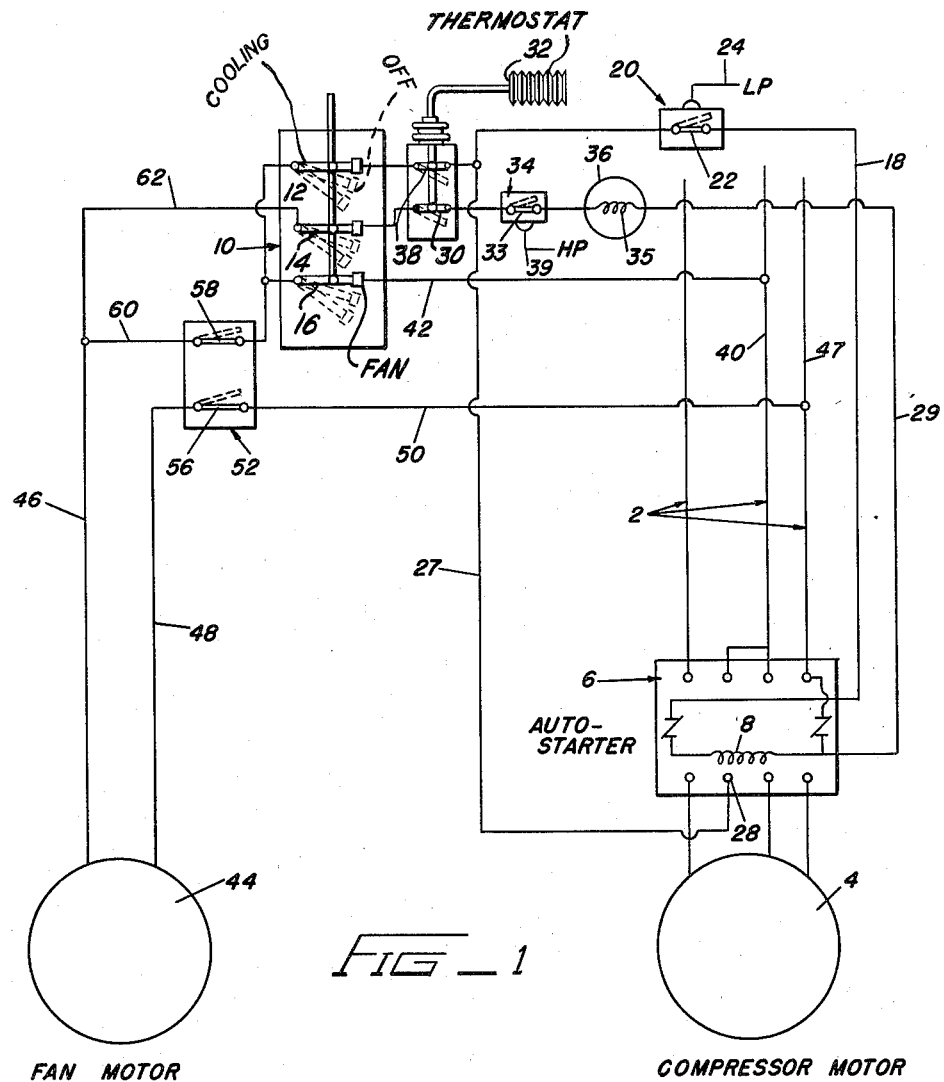
FIG_1
FAN MOTOR
COMPRESSOR MOTOR
INVENTOR.
EMANUEL FEINBERG
BY
Hauke, Hardesty & Schmidt
ATTORNEYS.

Patented Mar. 6, 1951

2,544,592

UNITED STATES PATENT OFFICE 2,544,592

AIR CONDITIONING APPARATUS

Emanuel Feinberg, Detroit, Mich.

Application March 16, 1948, Serial No. 15,073

5 Claims. (Cl. 62—4)

This invention relates to air conditioning apparatus, particularly to an automatic control for the apparatus, and is a continuation in part of patent application Serial No. 703,697, filed October 16, 1946, now abandoned.

It is desirable that air conditioning apparatus be operable with a minimum of attention. It is further desirable that the apparatus be made so that it can be shut down without danger to the refrigerant compressor upon restarting, because of liquid in the evaporator being drawn directly into the compressor.

It is the object of this invention to provide a control circuit for air conditioning apparatus which requires a minimum of attention and which assures that all refrigerant liquid in the evaporator is pumped out even after the cooling switch has been turned off.

The two figures of the drawings show two embodiments of the control circuit of the invention as it may be applied to any of a number of pieces of air conditioning equipment. In actual practise, this control circuit is applied to the equipment shown in my copending application Serial No. 703,698, filed October 16, 1946.

A power source such as the three phase line 2 is shown as being connected to a compressor motor 4 through a magnetic starting switch indicated generally at 6. Starting switch 6 may be any of a number of conventional magnetic auto starters (such as General Electric Company catalogue No. CR 7006 or Arrow-Hart & Hegeman Electric Company No. 28555) having an electro magnetic coil 8 which when energized closes the switch and holds it closed.

A switch 10, such as the Cutler-Hammer sequence switch catalogue No. 7320, is shown as providing three circuits through it by means of contacts 12, 14 and 16, all shown closed in full lines and open in dotted lines. Contact 12 is connected to one end of coil 8 by means of wire 18 and low pressure control switch 20. Switch 20 has a contact 22 which is opened when the pressure in the refrigerant circuit falls below a predetermined minimum on the low side. The line 24 indicates schematically a conduit connecting the switch 20 with the low side of the refrigerant circuit. A wire 27 connects contact 22 with contact 28 of the auto starter.

Contact 14 is connected with wire 47 of the power line by means of wire 29, the contact 30 of thermostatically operated switch 32, contact 33 of the high pressure control switch 34, and through the coil 35 of solenoid valve 36. Switch 32 may be any satisfactory thermostatically operated switch having the aforenamed contact 30 and a thermally sensitive element which will be so located as to be sensitive to the temperature in the space which is to be maintained at or near a predetermined temperature. Switch 32 also preferably operates a second contact 38 disposed in the circuit of contact 12, low pressure switch 20, and wire 18. As will be understood by those skilled in the art, high pressure switch 34 opens its contact 33 when the pressure in the refrigerant line exceeds a predetermined maximum. The line 39 indicates schematically a conduit connecting the switch 34 with the high side of the refrigerant circuit.

Solenoid valve 36 is placed in the refrigerant circuit line, between the condenser and the expansion valve, preferably close to the expansion valve.

Contact 16 is connected to wire 40 of the power source 2 by means of wire 42.

A fan motor 44 is connected to contact 16 through wire 46 and the branch connections shown, and to line 47 of power source 2 through wires 48 and 50 and through current responsive switch 52. Switch 52 may be any satisfactory overload current or current sensitive switch, shown here as provided with a bimetallic element 56. The switch 52 preferably has a second contact 58 disposed in one of the branch circuits 60 of wire 46. The other branch circuit 62 is in series with contact 30 of room thermostat 32 through contact 14 of switch 10.

Fig. 2 is identical with the sole figure of the above-identified application Serial No. 703,697, and shows a simplified version of the control circuit shown in Fig. 1. In Fig. 2, a power source such as the three phase line 202 is shown as being connected to a compressor motor 204 through a magnetic starting switch indicated generally at 206. Starting switch 206 may be any of a number of conventional magnetic auto starters having an electro-magnetic coil 208 which when energized closes the switch and holds it closed.

A switch 210 is shown as providing three circuits through it by means of contacts 212, 214 and 216, all shown closed in full lines and open in dotted lines. Contact 212 is connected to one end of coil 208 by means of wire 218 and dual pressure control switch 220. Switch 220 has a contact 222 which is opened when the pressure in the refrigerant circuit exceeds a predetermined maximum on the high side or falls below a predetermined minimum on the low side. The lines 224 and 226 indicate schematically conduits connecting the switch 220 with the high and low sides of the refrigerant circuit. A wire 227 connects contact 222 with wire 228 of the auto starter compressor motor connection.

Contact 214 is connected with wire 229 of the power line 202 through the contact 230 of thermostatically operated switch 232 and through the coil 234 of solenoid valve 236. Switch 232 may be any satisfactory thermostatically operated switch having the aforenamed contact 230 and a thermally sensitive element 238. Thermal element 238 will be so located as to be sensitive to the temperature of the space which is to be maintained at or near a predetermined temperature.

Solenoid valve 236 is placed in the refrigerant circuit line, between the condenser and the expansion valve, preferably close to the expansion valve.

Contact 216 is connected to wire 240 of the power source 202 by means of wire 242.

A fan motor 244 is connected to contact 216 through wire 246, and to line 229 of power source 202 through wires 248 and 250 and through current responsive or overload current switch 252. Switch 252 may be any satisfactory current overload or current responsive switch, shown here as provided with a bimetallic element 256.

Operation

The description of the operation of air conditioning apparatus controlled according to this invention will begin with the apparatus running. Assuming that thermostat 32 calls for cooling, contacts 30 and 38 are in the closed position. It is assumed that switch 10 is turned to "cooling" position so that contacts 12, 14 and 16 are all closed. Accordingly coil 35 of solenoid valve 36 is energized because it is connected at one end to wire 47 of power source 2 and at its other end through contacts 33, 30, 14, 58, and 16, and wire 42 to wire 40 of the power source 2. With the solenoid 34 thus energized, the valve is open, permitting the circulation of refrigerant fluid.

Compressor motor 4 receives power through magnetic switch 6 and fan motor 44 receives power through switches 10 and 52. When the temperature in the space to be air conditioned has dropped sufficiently to satisfy room thermostat 32, contacts 30 and 38 open and coil 35 is deenergized. The solenoid operated valve 36 thereupon closes, stopping the circulation of refrigerant. With refrigerant no longer free to circulate, the pressure on the low side of the refrigerant circuit is soon pumped down below the predetermined minimum, and contact 22 of switch 20 opens, de-energizing coil 8 of switch 6. Switch 6 thereupon opens and shuts down the compressor motor. The fan motor continues to operate so long as contacts 16, 56, and 58 remain closed.

When thermostat 32 again calls for cooling, contact 30 closes, again energizing solenoid 35 to open the valve. Refrigerant then begins again to circulate, and the pressure on the low side rises to the predetermined minimum required to close contact 22 of switch 20. Coil 8, with one side connected to wire 47 of power source 2, is then energized because its other end is connected through wire 18, contact 22 of switch 20, contact 38 of switch 32, contacts 12 and 16 of switch 10, and wire 42 to wire 40 of power source 2. The magnetic switch then closes and compressor motor 4 starts.

Switch 10 is so constructed that when it is set for "cooling" all three contacts 12, 14 and 16 are closed. But when it is set at the "fan" position, contacts 12 and 14 are open and contact 16 remains closed. In the off position, all three contacts are open. Accordingly, the refrigerant part of the air conditioning apparatus can be shut down by turning switch 10 to either its "fan" position or its "off" position. If, with the unit running, switch 10 is turned to open contacts 12 and 14, the above described circuit for coil 8 through contacts 12 and 16 is broken and coil 8 would be de-energized if that were its only connection to wire 40. However, bearing in mind that, by hypothesis, the unit was running (switch 6 closed) when switch 10 was turned to open contacts 12 and 14, it will be seen that coil 8 is connected to wire 40 through wire 18, contact 22 of switch 20, wire 27, through switch 6 which is closed because the unit was running. With contact 14 open, coil 35 is deenergized, closing solenoid valve 36. Now, when all the liquid in the evaporator is pumped out, the pressure in the low side of the refrigerant circuit falls below the predetermined minimum and contact 22 of switch 20 opens. Coil 8 is thereupon de-energized, opening switch 6. The compressor motor now remains shut down as long as contacts 12 and 14 of switch 10 remain open because there is no other way of again energizing coil 8.

The operation of the circuit of Fig. 2 is similar to that of Fig. 1 and will be understood by those skilled in the art from the foregoing description of the operation of the Fig. 1 circuit.

I claim:

1. In an air-conditioning apparatus control circuit, an electric power source, an electric motor, a switch disposed to connect the motor to the power source, electrical means to open and close the switch, a second electric motor, a second switch connecting the power source to the electrical means and to the second motor, and a connection from the power source to the electrical means independent of the second switch.

2. The invention of claim 1, in which the last-named connection is through the first-named switch.

3. In an air-conditioning apparatus control circuit, an electric power source, an electric motor, a switch disposed to connect the motor to the power source, electro-magnetic means to hold the switch closed, a second electric motor, a second switch connecting the power source to the electro-magnetic means and to the second motor, and a connection from the power source through the first-named switch to the electro-magnetic means.

4. The invention of claim 3, and means responsive to refrigeration requirements to break the last-named connection.

5. In a refrigeration system including a fluid circuit having operatively interposed therein an electrically driven compressor, an expansion valve, and a power electric circuit to drive said compressor; an electric control circuit for said power electric circuit, said control circuit including thermostat means responsive to temperature within the refrigerated air space and adapted to interrupt and to close said power circuit in response to such temperature; a parallel circuit connected to said control circuit and by-passing said thermostat means and providing a path for electric current within said control circuit and thereby adapted to maintain the power circuit closed to drive said compressor after said thermostat means operated to interrupt said control circuit; switch means operatively interposed within said control circuit and adapted to make and to break the same; pressure responsive means interposed within said fluid circuit on the low pressure side of said expansion valve, said pressure responsive means being adapted to operate said switch means for breaking said control circuit only after the pressure on said low side of the fluid circuit decreased below a predetermined limit; and a valve operatively interposed within said fluid circuit on the high pressure side of said expansion valve and adapted to interrupt the fluid circuit when the power electric circuit is interrupted.

EMANUEL FEINBERG.

REFERENCES CITED

The following references are of record in the file of this patent:

UNITED STATES PATENTS

| Number | Name | Date |
|---|---|---|
| 1,396,835 | Hanff | Nov. 15, 1921 |
| 1,826,477 | Olpp | Oct. 6, 1931 |
| 2,145,909 | Zwickl | Feb. 7, 1939 |
| 2,191,965 | McGrath | Feb. 27, 1940 |
| 2,191,967 | Miller | Feb. 27, 1940 |
| 2,221,798 | Hollander | Nov. 19, 1940 |
| 2,226,296 | Newton | Dec. 24, 1940 |
| 2,354,787 | Addicks | Aug. 1, 1944 |

FOREIGN PATENTS

| Number | Country | Date |
|---|---|---|
| 268,532 | Great Britain | Apr. 7, 1927 |